(12) United States Patent
Jones et al.

(10) Patent No.: US 10,495,489 B2
(45) Date of Patent: Dec. 3, 2019

(54) INVENTORY MONITORING SYSTEM AND ASSOCIATED METHODS

(71) Applicant: Walmart Apollo, LLC, Bentonville, AR (US)

(72) Inventors: Matthew Allen Jones, Bentonville, AR (US); Aaron Vasgaard, Fayetteville, AR (US); Nicholaus Adam Jones, Fayetteville, AR (US); Robert James Taylor, Rogers, AR (US)

(73) Assignee: Walmart Apollo, LLC, Bentonville, AR (US)

( * ) Notice: Subject to any disclaimer, the term of this patent is extended or adjusted under 35 U.S.C. 154(b) by 174 days.

(21) Appl. No.: 15/850,014

(22) Filed: Dec. 21, 2017

(65) Prior Publication Data

US 2018/0202841 A1      Jul. 19, 2018

Related U.S. Application Data

(60) Provisional application No. 62/445,946, filed on Jan. 13, 2017.

(51) Int. Cl.
| | |
|---|---|
| *G01G 5/06* | (2006.01) |
| *G01G 7/02* | (2006.01) |
| *H01H 3/14* | (2006.01) |
| *G01D 5/26* | (2006.01) |
| *G01F 23/00* | (2006.01) |
| *G01G 19/42* | (2006.01) |
| *G06Q 10/08* | (2012.01) |

(52) U.S. Cl.
CPC ............. *G01D 5/264* (2013.01); *G01F 23/00* (2013.01); *G01G 5/06* (2013.01); *G01G 7/02* (2013.01); *G01G 19/42* (2013.01); *H01H 3/141* (2013.01); *G06Q 10/087* (2013.01)

(58) Field of Classification Search
CPC .................................. G01G 5/06; G01G 7/02; H01H 3/141; G06Q 10/087
See application file for complete search history.

(56) References Cited

U.S. PATENT DOCUMENTS

| | | |
|---|---|---|
| 3,426,326 A | 2/1969 | Goldstein |
| 5,671,362 A | 9/1997 | Cowe et al. |
| 7,233,241 B2 | 6/2007 | Overhultz et al. |
| 7,584,016 B2 | 9/2009 | Weaver |
| 8,938,396 B2 | 1/2015 | Swafford, Jr. et al. |
| 9,275,361 B2 | 3/2016 | Meyer |
| 2004/0034581 A1 | 2/2004 | Hill et al. |
| 2005/0093690 A1 | 5/2005 | Miglionico |
| 2006/0071774 A1 | 4/2006 | Brown et al. |

(Continued)

*Primary Examiner* — Thanh Luu
(74) *Attorney, Agent, or Firm* — McCarter & English, LLP; David R. Burns

(57) ABSTRACT

An item monitoring system including a bladder including a body with a hollow interior configured to be filled with a fluid is described. The system includes an energy generation mechanism connected to the bladder and including a tube equipped with a wire core or surrounded by a wire coil in fluid communication with the bladder, and a magnetic item movably disposed within the tube. The system includes a light source electrically connected to the energy generation mechanism. Displacement of the fluid from the bladder into the tube moves the magnetic item within the tube, thereby generating an electrical current to emit a light from the light source.

20 Claims, 8 Drawing Sheets

(56) References Cited

U.S. PATENT DOCUMENTS

| | | |
|---|---|---|
| 2007/0201221 A1* | 8/2007 | Cherdak .............. A43B 3/0005 |
| | | 362/103 |
| 2011/0241831 A1 | 10/2011 | Makiranta et al. |
| 2012/0310570 A1 | 12/2012 | Pyne et al. |
| 2015/0041616 A1 | 2/2015 | Gentile et al. |
| 2016/0048798 A1 | 2/2016 | Meyer et al. |

* cited by examiner

INVENTORY MONITORING SYSTEM AND ASSOCIATED METHODS

CROSS-REFERENCE TO RELATED APPLICATIONS

This application claims the benefit of commonly assigned U.S. Provisional Patent Application No. 62/445,946, which was filed on Jan. 13, 2017. The entire content of the foregoing provisional patent application is incorporated herein by reference.

BACKGROUND

Taking inventory of items on shelving provides an indication of the number of items disposed on the shelf and may indicate a need for restocking of the shelf. Shelf sensors and video analytics are available in industry to electronically monitor inventory on shelving.

SUMMARY

Exemplary embodiments of the present invention provide inventory monitoring systems including a bladder filled with a fluid, an energy generation mechanism in fluid communication with the bladder, and a light source electrically connected to the energy generation mechanism. Displacement of the fluid from the bladder into a tube of the energy generation mechanism moves a magnetic item (e.g., a ball, a cylinder, or the like) within the tube, thereby generating an electrical current to emit a light from the light source. The light can be emitted continuously or a single time. The light provides a visual indicator regarding a status of the inventory on the shelf that is powered solely by the internal energy generation mechanism without necessitating an external power source. An image capture device (e.g., a camera) can be used to detect the emitted light to determine the inventory status on the shelf. The closed system includes low cost components with minimal data processing if an image capture device is implemented, thereby reducing overhead costs for monitoring inventory.

In one embodiment, an exemplary item monitoring system is provided that includes a bladder configured to be positioned on a supporting surface of a shelf and further configured to receive one or more items thereon. The bladder includes a body that includes a hollow interior configured to be filled with a fluid. The system includes an energy generation mechanism connected to the bladder. The energy generation mechanism includes a tube equipped with a wire core or surrounded by a wire coil and including an interior passage in fluid communication with the hollow interior of the body of the bladder, and a magnetic item movably disposed within the tube. The system includes a light source electrically connected to the energy generation mechanism. Displacement of at least a portion of the fluid from the hollow interior of the body into the interior passage of the tube due to the one or more items placed on the body of the bladder moves the magnetic item within the tube. Movement of the magnetic item within the tube generates an electrical current to emit a light from the light source.

In another embodiment, an exemplary item monitoring system is provided that includes a bladder configured to be positioned on a supporting surface of a shelf and further configured to receive one or more items thereon. The bladder includes a body that includes a hollow interior configured to be filled with a fluid. The system includes an energy generation mechanism connected to the body. The energy generation mechanism includes a tube equipped with a wire core or surrounded by a wire coil and including an interior passage in fluid communication with the hollow interior of the body of the bladder, and a magnetic item movably disposed within the tube. The system includes a light source electrically connected to the energy generation mechanism. The system includes an image capture device. Displacement of at least a portion of the fluid from the hollow interior of the body into the interior passage of the tube due to the one or more items placed on the body of the bladder moves the magnetic item within the tube. Movement of the magnetic item within the tube generates an electrical current to emit a light from the light source. The image capture device is configured to detect the light emitted from the light source to determine a fullness of the shelf with the one or more items.

In another embodiment, an exemplary method of monitoring items on a shelf including a supporting surface is provided. The method includes positioning a bladder on the supporting surface of the shelf. The bladder includes a body that includes a hollow interior configured to be filled with a fluid. The method includes detecting with an image capture device light from a light source electrically connected to an energy generation mechanism connected to the body of the bladder. The energy generation mechanism includes a tube equipped with a wire core or surrounded by a wire coil and including an interior passage in fluid communication with the hollow interior of the body of the bladder, and a magnetic item movably disposed within the tube. The method includes identifying a change in items on the shelf based on the detected light. Positioning one or more items on the bladder displaces at least a portion of the fluid from the hollow interior of the body into the interior passage of the tube causing movement of the magnetic item. Movement of the magnetic item within the tube generates an electrical current to emit a light from the light source.

In another embodiment, an exemplary sensing system is provided that includes a membrane including a hollow interior configured to be filled with a fluid. The system includes an energy generation mechanism connected to the membrane. The energy generation mechanism includes a tube equipped with a wire core or surrounded by a wire coil and including an interior passage in fluid communication with the hollow interior of the membrane, and a magnetic item movably disposed within the tube. The system includes a light source electrically connected to the energy generation mechanism. Displacement of at least a portion of the fluid from the hollow interior of the membrane into the interior passage of the tube due to pressure imparted on the membrane moves the magnetic item within the tube. Movement of the magnetic item within the tube generates an electrical current to emit a light from the light source.

In another embodiment, an exemplary sensing system is provided that includes a membrane including a hollow interior configured to be filled with a fluid. The system includes an energy generation mechanism connected to the membrane. The energy generation mechanism includes a tube equipped with a wire core or surrounded by a wire coil and including an interior passage in fluid communication with the hollow interior of the membrane, and a magnetic item movably disposed within the tube. The system includes a light source electrically connected to the energy generation mechanism. The system includes an image capture device. Displacement of at least a portion of the fluid from the hollow interior of the membrane into the interior passage of the tube due to pressure imparted on the membrane moves the magnetic item within the tube. Movement of the magnetic item within the tube generates an electrical current to emit a light from the light source. The image capture device is configured to detect the light emitted from the light source.

In another embodiment, an exemplary method of sensing pressure on a membrane is provided. The method includes providing the membrane including a hollow interior configured to be filled with a fluid. The method includes detecting with an image capture device light from a light source electrically connected to an energy generation mechanism connected to the membrane. The energy generation mechanism includes a tube equipped with a wire core or surrounded by a wire coil and including an interior passage in fluid communication with the hollow interior of the membrane, and a magnetic item movably disposed within the tube. The method includes identifying a change in imparted pressure on the membrane based on the detected light. Imparting pressure on the membrane displaces at least a portion of the fluid from the hollow interior of the membrane into the interior passage of the tube causing movement of the magnetic item. Movement of the magnetic item within the tube generates an electrical current to emit a light from the light source.

It should be appreciated that other combinations and/or permutations of embodiments are envisioned as also being within the scope of the present invention. Other objects and features will become apparent from the following detailed description considered in conjunction with the accompanying drawings. It is to be understood, however, that the drawings are designed as an illustration only and not as a definition of the limits of the present disclosure.

BRIEF DESCRIPTION OF THE DRAWINGS

To assist those of skill in the art in making and using the disclosed inventory monitoring systems and methods, reference is made to the accompanying figures. The accompanying figures, which are incorporated in and constitute a part of this specification, illustrate one or more embodiments of the invention and, together with the description, help to explain the invention. In the figures.

DETAILED DESCRIPTION

It should be understood that certain relative terminology used herein, such as, but not necessarily limited to, "front", "rear", "left", "top", "bottom", "vertical", "horizontal", "up" and "down" is solely for the purposes of clarity and designation and is not intended to limit embodiments to a particular position and/or orientation. Accordingly, such relative terminology should not be construed to limit the scope of the present disclosure. In addition, it should be understood that the scope of the present disclosure is not limited to embodiments having specific dimensions. Thus, any dimensions provided herein are for an exemplary purpose and are not intended to limit the invention to embodiments having particular dimensions.

Inventory on shelving is generally monitored manually by individuals in a facility to determine whether additional items need to be added to a particular shelf. Although shelf sensors and video analytics are available in industry to electronically monitor inventory on shelving, such options generally involve high overhead costs for equipment and data processing, and require an external power source that continuously provides power to the sensors and/or video equipment. Exemplary embodiments of the present invention address these concerns and provide an item monitoring system that includes a self-powered, closed system for monitoring items placed on a shelf. More particularly, the exemplary item monitoring system includes a bladder or membrane configured to be filled with a fluid, an energy generation mechanism in fluid communication with the bladder or membrane, and a light source electrically connected to the energy generation mechanism. As will be discussed in greater detail below, displacement of the fluid from the bladder or membrane actuates the energy generation mechanism to generate an electrical current to emit a light from the light source. The emitted light provides a visual indicator regarding a status of inventory on the shelf without the necessity of an external power source to power the light source.

Figure 1:
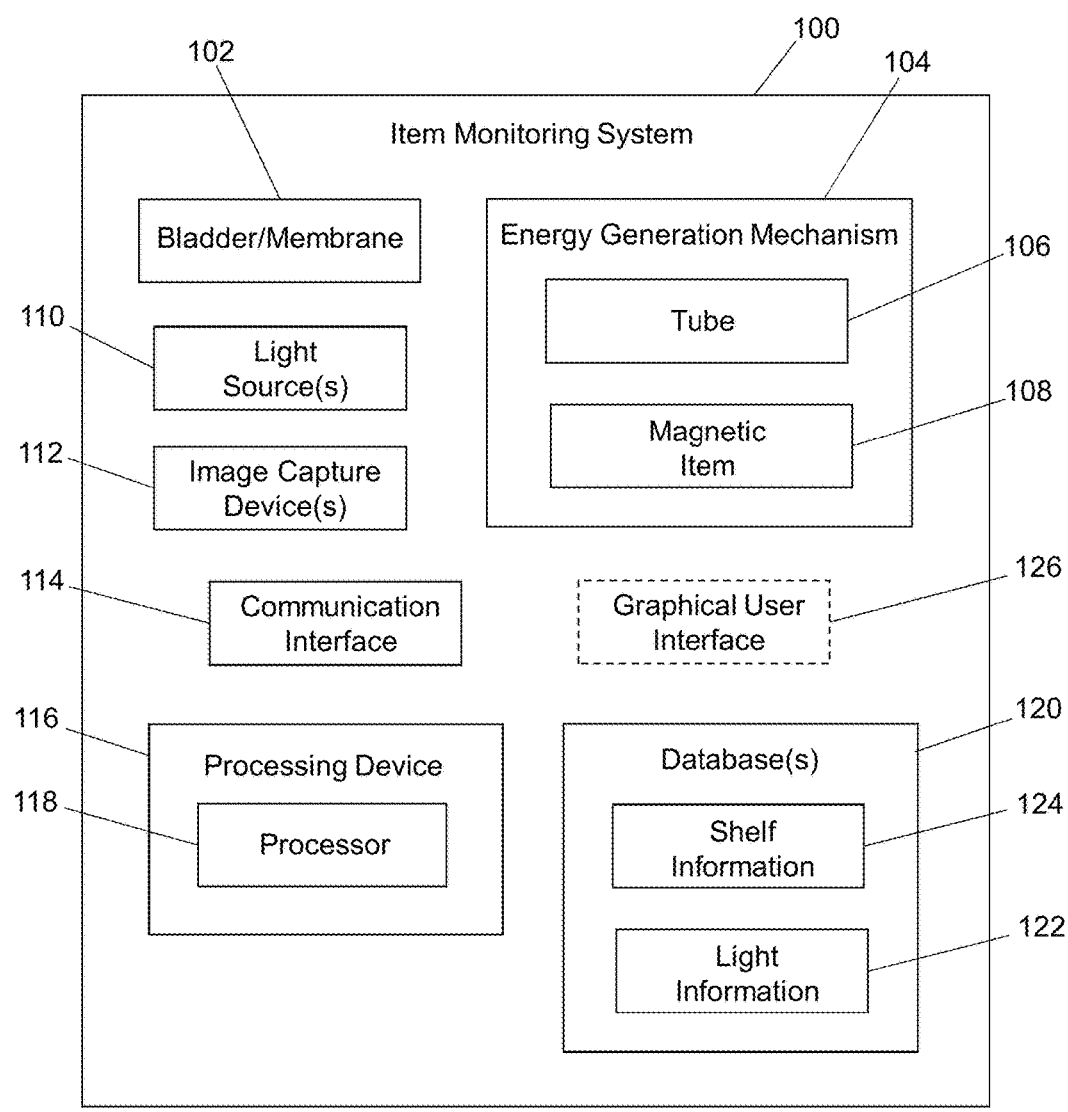
FIG. 1 is a block diagram of an exemplary item monitoring system in an embodiment.

FIG. 1 is a block diagram of an item monitoring system 100 (hereinafter "system 100") in accordance with exemplary embodiments. The system 100 includes a membrane or bladder 102 configured to be positioned on a supporting surface of a shelf. In one embodiment, the bladder 102 can be positioned on the supporting surface of the shelf and one or more items can be positioned directly on the bladder 102. In another embodiment, the bladder 102 can be positioned on the supporting surface of the shelf, an item supporting surface of the shelf can be positioned on the bladder 102, and one or more items can be positioned on the item supporting surface. The bladder 102 can thereby directly or indirectly support one or more items thereon.

The bladder 102 can define an elongated and substantially planar configuration, such that the planar configuration of the shelf is unaffected for support of the items. The bladder 102 includes a body with a bottom planar surface configured to be positioned on the supporting surface of the shelf, and a planar top surface configured to receive (directly or indirectly) the items thereon. In general, the bladder 102 can be fabricated from a flexible material (e.g., a rubber material, or the like). The body of the bladder 102 includes a hollow interior configured to be filled with a fluid, such as air or liquid. The bladder 102 can include an opening into the hollow interior for introduction of the fluid into the hollow interior, thereby at least partially inflating the bladder 102.

The system 100 includes an energy generation mechanism 104 connected to the bladder 102 in a fluidic manner. The energy generation mechanism 104 can include a tube 106 with an interior passage in fluid communication with the hollow interior of the body of the bladder 102. The system 100 is a closed fluid system such that the fluid can pass from the bladder 102 into the tube 106 through an open end of the tube (the opposing closed end of the tube 106 preventing the fluid from exiting the system 100), and the fluid can similarly pass from the tube 106 into the bladder 102. For example, placing an item on the bladder 102 displaces a portion of the fluid from the bladder 102 into the tube 106, and removing an item from the bladder 102 reduces the pressure imparted on the bladder 102 and displaces a portion of the fluid from the tube 106 back into the bladder 102.

The energy generation mechanism 104 further includes a magnetic item 108 (e.g., a ball, cylinder, or other structure with magnetic properties) movably disposed within the tube 106. In some embodiments, the tube 106 can be formed as a cylindrical tube with a wire core or the tube 106 can be surrounded by a wire coil. In some embodiments, the length of the tube 106 can be oriented vertically relative to a horizontal orientation of the shelf. As items are placed on or removed from the bladder 102, the amount of fluid displaced from the bladder 102 into the tube 106 varies. Displacement of fluid from the bladder 102 into the tube 106 moves the item 108 within the tube 106 (e.g., moves the item 108 upward within the tube 106). Displacement of fluid from the tube 106 into the bladder 102 allows the item 108 to move downward within the tube 106. Movement of the item 108 within the wire core of the tube 106 generates an electrical current. In particular, movement of the magnetic item 108 within the wire core or wire coil creates a magnetic field which generates the electrical current.

The system 100 includes one or more light sources 110 electrically connected to the energy generation mechanism 104 (e.g., through wired or wireless means). In one embodiment, the light source 110 can be one or more light emitting diodes (LEDs). The electrical current generated by movement of the item 108 within the tube 106 due to displacement of the fluid in the system 100 powers the light source 100 to emit a light. The energy generation mechanism 104 therefore acts as the sole, passive energy source of the light source 110, and the light source 110 emits the light without the need for an external power source. This configuration of the system 100 advantageously reduces the number of components required to power the light source and reduces the overall costs of the system 100 and costs of maintenance of the system 100. In some embodiments, the light is emitted from the light source 100 continuously such that the emitted light can be detected by the human eye. In some embodiments, the light is emitted from the light source 100 only momentarily (e.g., less than one second) and cannot be detected by the human eye but is instead captured by an imaging device.

Thus, as noted above, placing an item on the body of the bladder 102 creates a compression force on the body and increases the pressure within the bladder 102. The compression force and increased pressure causes displacement of at least a portion of the fluid from the hollow interior of the bladder 102 into the interior passage of the tube 106. Removal of the item from the body of the bladder 102 removes the compression force from the body and reduces the pressure within the bladder 102. Removal of the compression force and the subsequent reduced pressure on the bladder 102 causes displacement of at least a portion of the fluid from the interior passage of the tube 106 into the hollow interior of the bladder 102.

In some embodiments, the tube 106 defines a height extending between a bottom item position and a top item position (e.g., minimum and maximum heights of the item 108 within the tube 106). The position of the item 108 within the tube 106 relative to the bottom and top item positions is affected by the amount of the fluid displaced from the hollow interior of the bladder 102 into the interior passage of the tube 106. In some embodiments, based on the position of the item 108 within the tube 106 relative to the bottom and top item positions, a different color light is emitted from the light source 110 (e.g., a first light color, a second light color, or the like). The position of the item 108 within the tube 106 therefore corresponds to the fullness of the shelf with the one or more items (e.g., an inventory status).

For example, if the item 108 is positioned close to the bottom item position within the tube 106, the light emitted from the light source 110 can be red indicating an empty or low inventory on the shelf. As a further example, if the item 108 is positioned at a substantial midpoint between the bottom and top item positions, the light emitted from the light source 110 can be yellow indicating a partially full inventory on the shelf. As a further example, if the item 108 is positioned close to the top item position within the tube 106, the light emitted from the light source 110 can be green indicating a full or high inventory on the shelf.

In some embodiments, the system 100 can include one or more image capture devices 112 (e.g., photographic cameras, video cameras, combinations thereof, or the like). The image capture device 112 can be oriented to capture the light source 110 associated with one or more shelves. Thus, when the displaced fluid moves the item 108 within the tube 106 and generates an electrical current to emit a light from the light source 110, the image capture device 112 can be configured to detect the light and/or the light color emitted from the light source 110.

The system 100 can include a communication interface 114 and a processing device 116 including a processor 118. The communication interface 114 can electronically transmit an indication of the emitted light detected by the image capture device 112 from the image capture device 112 to the processing device 116. In some embodiments, the communication interface 114 can electronically transmit the indication of the emitted light detected by the image capture device 112 from the image capture device 112 to a database 120 including light information 122. The light information 122 can include the different colors of lights that can be emitted by the light source 110 and the corresponding inventory status of the shelf. The database 120 can include shelf information 124, such as the location of the shelf within a retail environment, the items disposed on a particular shelf and/or bin, the location of the image capture device 112, combinations thereof, or the like.

The detected light from the light source 110 can be processed by the processing device 116 to determine the inventory status of the shelf, and the communication interface 114 can electronically transmit a notification to an electronic device (e.g., a handheld electronic device, a smart electronic device, or the like) regarding the inventory status of the shelf. For example, the notification can provide information regarding the location of the shelf, the item(s) disposed on the shelf, the level of fullness of the shelf, the need for restocking of one or more items, combinations thereof, or the like. In some embodiments, the electronic device includes a graphical user interface (GUI) 126 for displaying the notification to a user. Based on receiving the notification, an individual can restock the appropriate shelf with the appropriate items.

Figure 2:
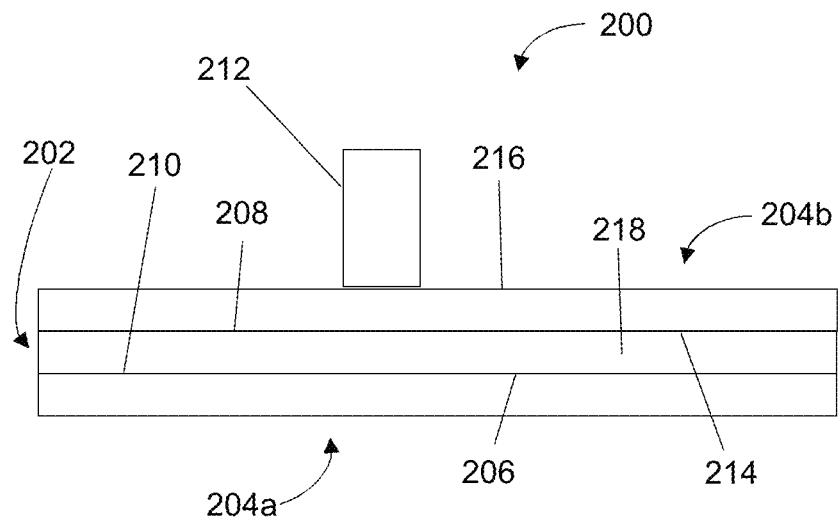
FIG. 2 is a diagrammatic side view of an exemplary item monitoring system in an embodiment.
Figure 3:
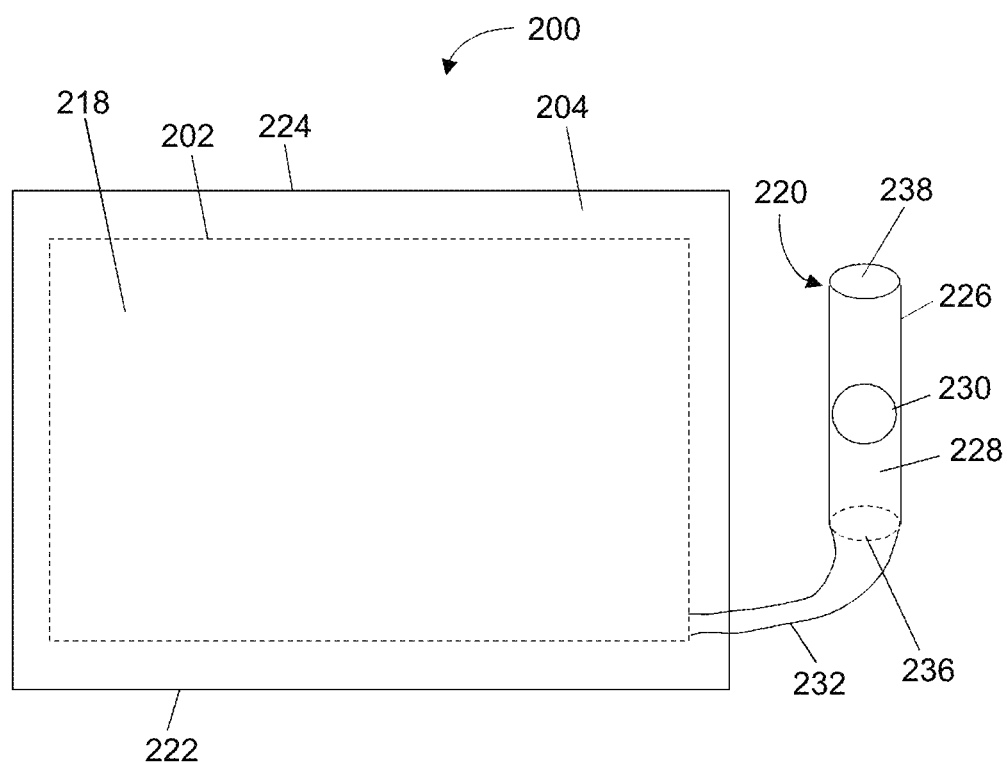
FIG. 3 is a diagrammatic detailed view of an exemplary item monitoring system in an embodiment.
Figure 4:
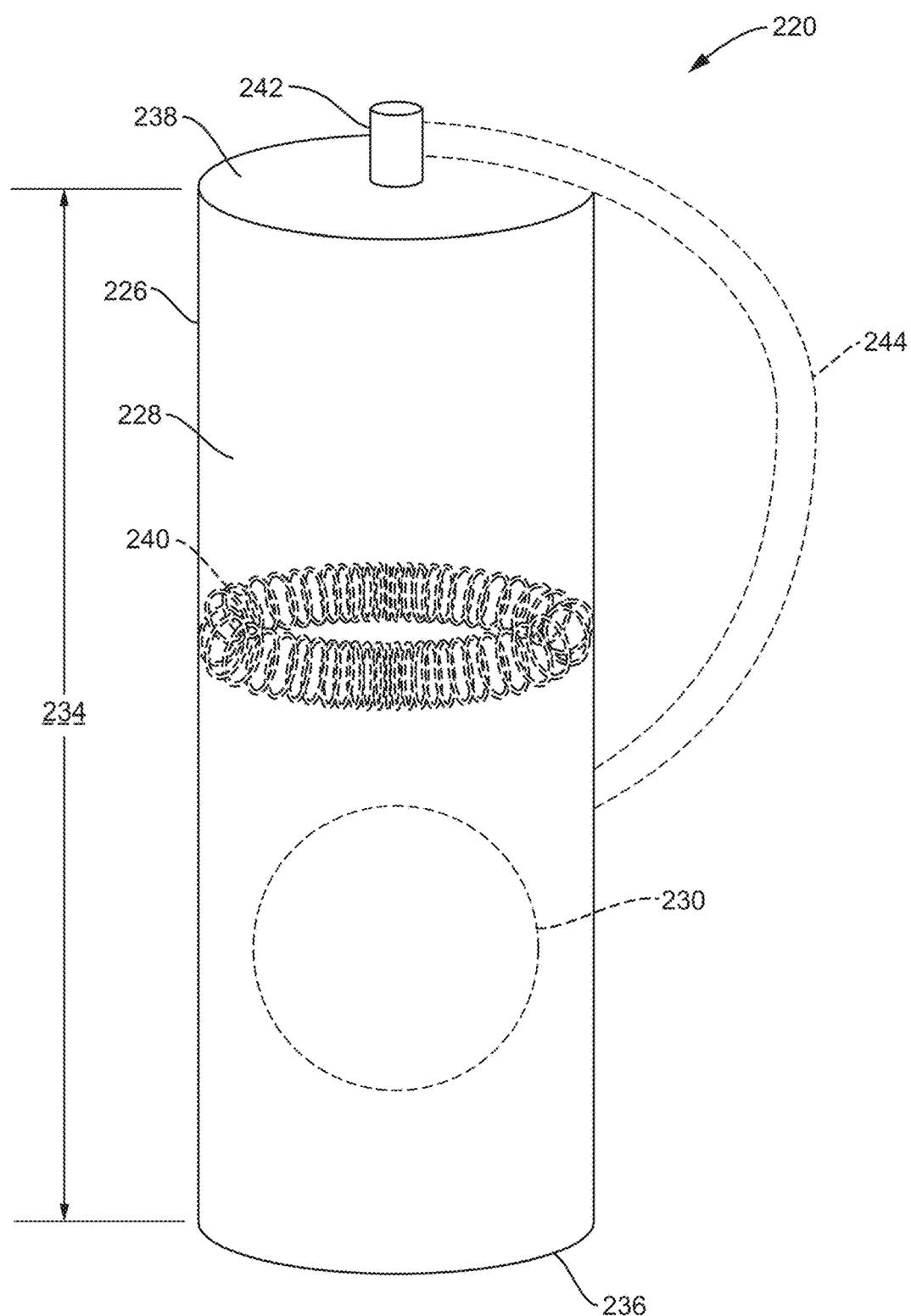
FIG. 4 is a diagrammatic detailed view of an exemplary energy generation mechanism of an item monitoring system in an embodiment.

FIGS. 2-4 are diagrammatic side and detailed views of an item monitoring system 200 (hereinafter "system 200") in accordance with exemplary embodiments. The system 200 can be substantially similar in structure and function to the system 100, except for the distinctions noted herein. The system 200 includes at least one bladder 202 disposed on one or more shelf portions 204*a*, 204*b* (collectively referred to herein as shelf 204). The body of the bladder 202 generally defines a bottom, substantially planar surface 206 and a top, substantially planar surface 208. Between the top and bottom surfaces 206, 208, the bladder 202 includes a hollow interior 218 configured and dimensioned to be at least partially filled with a fluid.

In some embodiments, the first shelf portion 204*a* includes a supporting surface 210 on which the bottom surface 206 of the bladder 202 can be positioned. In some embodiments, one or more products or items 212 can be positioned directly on the top surface 208 of the bladder 202. In some embodiments, a second shelf portion 204*b* including a bottom surface 214 and a top, item supporting surface 216 can be disposed on the top surface 208 of the bladder 202 to substantially cover the bladder 202 and position the bladder 202 between the first and second shelf portions 204*a*, 204*b*. In such embodiments, the items 212 can be positioned on the item supporting surface 216 of the second shelf portion 204*b* (e.g., indirectly positioning the items 212 on the bladder 202). Fluctuations in compression forces on the bladder 202 occur based on items 212 placed on or removed from the bladder 202 or the second shelf portion 204*b*.

As shown in FIGS. 3 and 4, the system 200 includes an energy generation mechanism 220 connected to the bladder 202. In some embodiments, the energy generation mechanism 220 can be disposed at or near a front edge 222 of the shelf 204 (e.g., the edge of the shelf 204 facing customers), at or near a rear edge 224 of the shelf 204, or in-between the front and rear edges 222, 224. The energy generation mechanism 220 can be in fluid communication with the hollow interior 218 of the bladder 202.

The energy generation mechanism 220 includes a tube 226 with an interior passage 228 in fluid communication with the interior 218 of the bladder 202. The energy generation mechanism 220 further includes a magnetic item 230 movably disposed within the interior passage 228 of the tube 226. In one embodiment, the magnetic item 230 can be in the form of a magnetic ball. In one embodiment, the magnetic item 230 can be in the form of a magnetic cylinder or any other magnetic structure capable of unimpeded travel within the tube 226. In one embodiment, the magnetic item 230 can be fabricated from a rare earth magnet, such as neodymium. In some embodiments, a connecting tube or passage 232 can fluidically connect the interior 218 of the bladder 202 with the interior passage 228 of the tube 226. A height 234 of the tube 226 can extend between a bottom item position 236 and a top item position 238. Although illustrated as extending parallel to the plane defined by the shelf 204, it should be understood that the height 234 of the tube 226 may structurally extend substantially vertically relative to horizontal (e.g., the plane defined by the top surface of the shelf 204) to accurately reflect the displacement of the fluid from the bladder 202.

The diameter of the tube 226 along the height 234 is dimensioned uniformly to allow the magnetic item 230 to move therein based on fluid displacement into and out of the interior passage 228, while the diameter or sizing of the tube 226 changes or reduces beyond the bottom item position 236 to prevent the magnetic item 230 from traveling beyond the height 234 of the tube 226, thereby setting a limit in which the magnetic item 230 can travel. The tube 226 includes a wire core 240 extending along the height 234. Movement of the magnetic item 230 within the wire core 240 of the tube 226 (or within a wire coil surrounding the tube) generates an electrical current used to power a light source such as those described herein. The system 200 includes a light source 242 (e.g., one or more LEDs) electrically connected to the energy generation mechanism 220 by one or more wires 244 (e.g., lead wires). Although illustrated as attached to the top wall of the tube 226, the light source 242 can be located at any position of the system 200, such as at or near the front edge 222 of the shelf 204, along the height 234 of the tube 226, or the like. Although not illustrated, the system 200 can include an image capture device configured to detect the emitted light from the light source 242 and transmit an indication of the light used to determine the inventory status of the shelf to a GUI.

Figure 5:
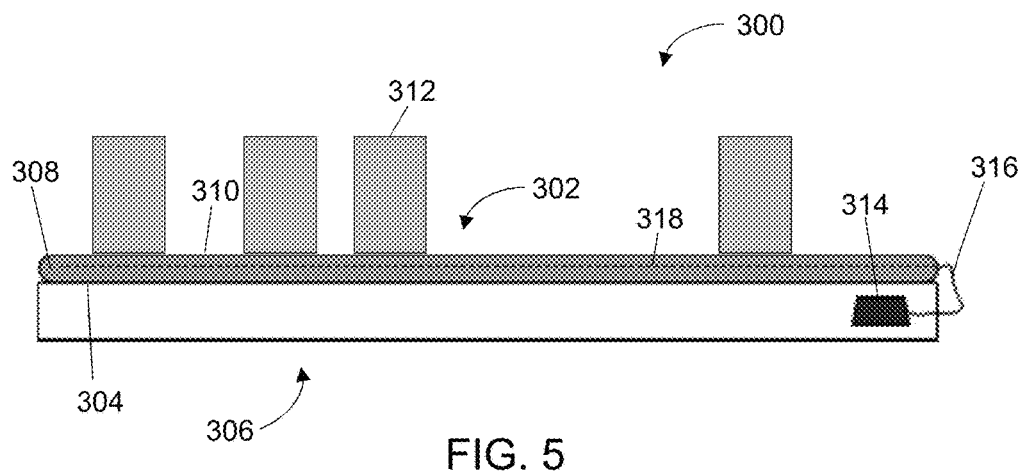
FIG. 5 is a diagrammatic side view of an exemplary item monitoring system in an embodiment.
Figure 6:
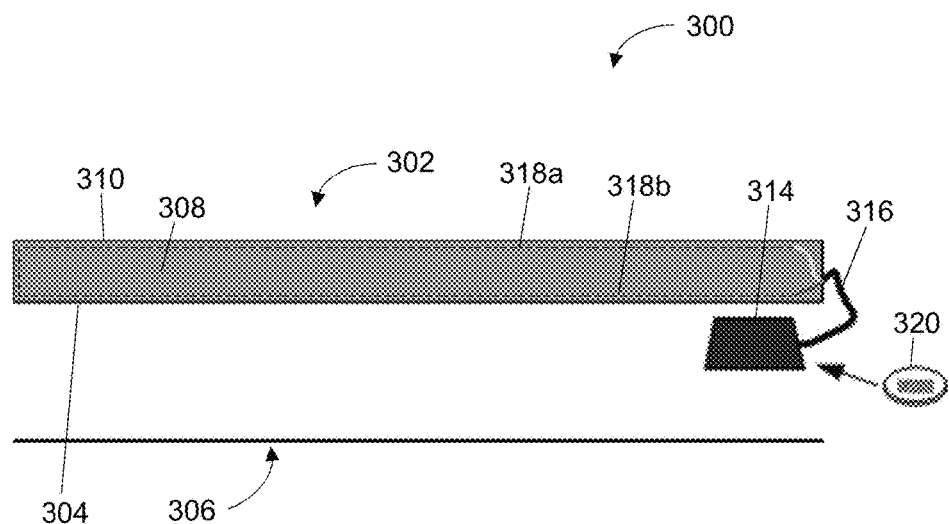
FIG. 6 is a diagrammatic side view of an exemplary item monitoring system in an embodiment.

FIGS. 5 and 6 are diagrammatic side views of an item monitoring system 300 (hereinafter "system 300") in accordance with exemplary embodiments. The system 300 can be substantially similar in structure and function to the systems 100, 200, except for the distinctions noted herein. The system 300 includes a bladder 302 disposed on a supporting surface 304 of a shelf 306. The bladder 302 includes a hollow interior 308 configured to be filled with a fluid and a top surface 310 defining a supporting surface for one or more items 312.

The system 300 includes a light source 314 (e.g., an LED) connected by one or more wires 316 to electrical contacts 318*a*, 318*b* (collectively referred to herein as electrical contacts 318) extending through the interior 308 of the bladder 302. Although not illustrated, the system 300 can include an energy generation mechanism in fluid communication with the bladder 302. In some embodiments, the system 300 can include a battery 320 electrically connected to the light source 314. In some embodiments, the system 300 can include an energy generation mechanism (e.g., energy generation mechanism 220) electrically connected to the battery 320 such that the current induced by the energy generation mechanism 220 is stored within the battery 320. When the items 312 are positioned on the bladder 302, as shown in FIG. 5, the weight of the items 312 compresses the bladder 302 and creates a contact between the electrical contacts 318*a*, 318*b* (e.g., completes a circuit by contacting the metal portions of the electrical contacts 318*a*, 318*b*). When one or more of the items 312 are removed from the bladder 302, as shown in FIG. 6, the bladder 302 expands due to the lack of compressive forces on the bladder 302 and separates the electrical contacts 318*a*, 318*b*. The interrupted circuit created by the separated electrical contacts 318 causes the light source 314 to emit a light (e.g., a momentary light, a continuous light, a flashing light, or the like) to indicate reduced or low inventory of items 312 on the shelf 306. The inventory status of the shelf 306 may therefore be monitored by observing the light.

Figure 7:
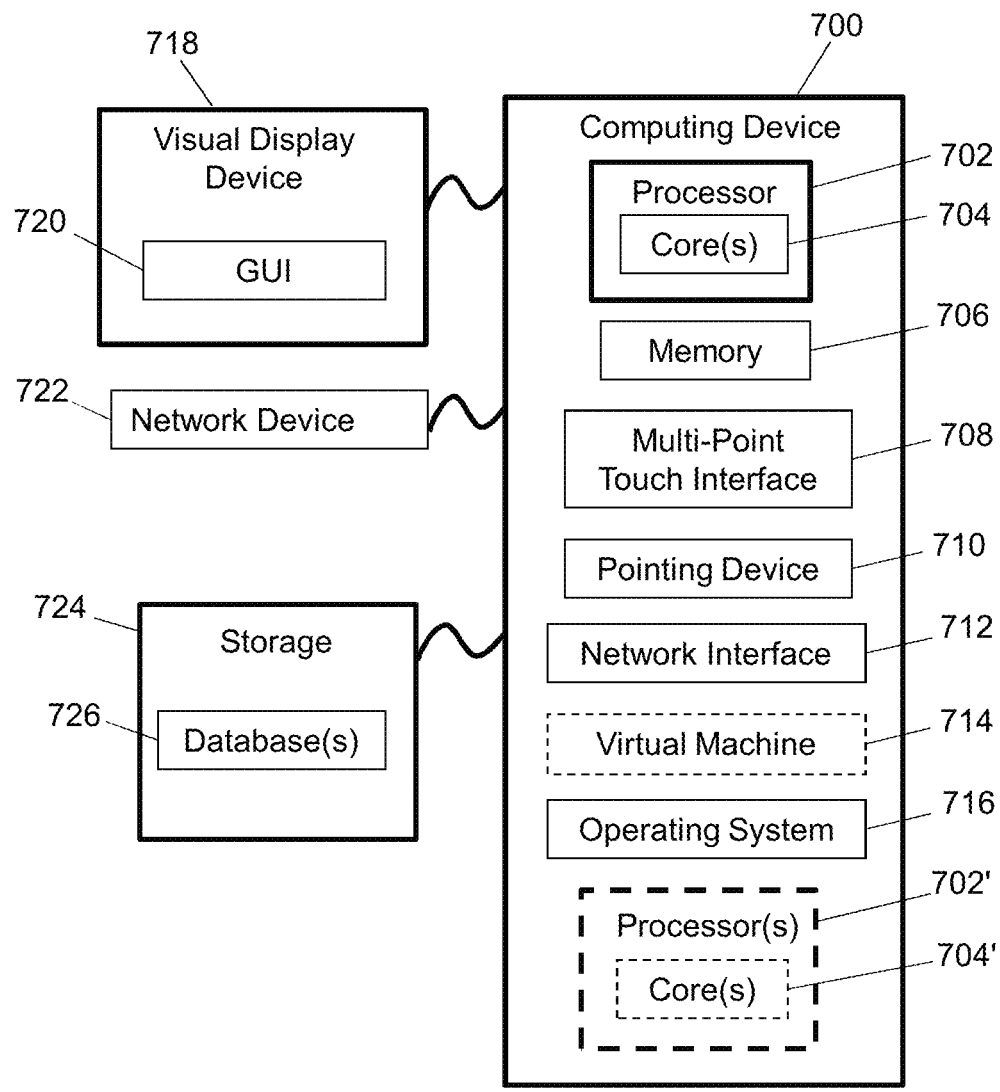
FIG. 7 is a block diagram of a computing device in an embodiment.

FIG. 7 is a block diagram of a computing device 700 in accordance with exemplary embodiments. The computing device 700 includes one or more non-transitory computer-readable media for storing one or more computer-executable instructions or software for implementing exemplary embodiments. The non-transitory computer-readable media may include, but are not limited to, one or more types of hardware memory, non-transitory tangible media (for example, one or more magnetic storage disks, one or more optical disks, one or more flash drives), and the like. For example, memory 706 included in the computing device 700 may store computer-readable and computer-executable instructions or software for implementing exemplary embodiments of the present disclosure (e.g., instructions for controlling the image capture device 112, the communication interface 114, the processing device 116, combinations thereof, or the like). The computing device 700 also includes configurable and/or programmable processor 702 and associated core 704, and optionally, one or more additional configurable and/or programmable processor(s) 702' and associated core(s) 704' (for example, in the case of computer systems having multiple processors/cores), for executing computer-readable and computer-executable instructions or software stored in the memory 706 and other programs for controlling system hardware. Processor 702 and processor(s) 702' may each be a single core processor or multiple core (704 and 704') processor.

Virtualization may be employed in the computing device 700 so that infrastructure and resources in the computing device 700 may be shared dynamically. A virtual machine 714 may be provided to handle a process running on multiple processors so that the process appears to be using only one computing resource rather than multiple computing resources. Multiple virtual machines may also be used with one processor.

Memory 706 may include a computer system memory or random access memory, such as DRAM, SRAM, EDO RAM, and the like. Memory 706 may include other types of memory as well, or combinations thereof.

A user may interact with the computing device 700 through a visual display device 718 (e.g., a personal computer, a mobile smart device, or the like), such as a computer monitor, which may display one or more user interfaces 720 (e.g., GUI 126) that may be provided in accordance with exemplary embodiments. The computing device 700 may include other I/O devices for receiving input from a user, for example, a keyboard or any suitable multi-point touch interface 708, a pointing device 710 (e.g., a mouse). The keyboard 708 and the pointing device 710 may be coupled to the visual display device 718. The computing device 700 may include other suitable conventional I/O peripherals.

The computing device 700 may also include one or more storage devices 724, such as a hard-drive, CD-ROM, or other computer readable media, for storing data and computer-readable instructions and/or software that implement one or more portions of the system 100, such as the image capture device 112, or the like. Exemplary storage device 724 may also store one or more databases 726 for storing any suitable information required to implement exemplary embodiments. For example, exemplary storage device 724 can store one or more databases 726 for storing information, such as data relating to the shelf information 124, light information 122, or the like, and computer-readable instructions and/or software that implement exemplary embodiments described herein. The databases 726 may be updated by manually or automatically at any suitable time to add, delete, and/or update one or more items in the databases.

The computing device 700 can include a network interface 712 configured to interface via one or more network devices 722 with one or more networks, for example, Local Area Network (LAN), Wide Area Network (WAN) or the Internet through a variety of connections including, but not limited to, standard telephone lines, LAN or WAN links (for example, 802.11, T1, T3, 56 kb, X.25), broadband connections (for example, ISDN, Frame Relay, ATM), wireless connections, controller area network (CAN), or some combination of any or all of the above. The network interface 712 may include a built-in network adapter, network interface card, PCMCIA network card, card bus network adapter, wireless network adapter, USB network adapter, modem or any other device suitable for interfacing the computing device 700 to any type of network capable of communication and performing the operations described herein. Moreover, the computing device 700 may be any computer system, such as a workstation, desktop computer, server, laptop, handheld computer, tablet computer (e.g., the iPad™ tablet computer), mobile computing or communication device (e.g., the iPhone™ communication device), or other form of computing or telecommunications device that is capable of communication and that has sufficient processor power and memory capacity to perform the operations described herein.

The computing device 700 may run an operating system 716, such as versions of the Microsoft® Windows® operating systems, the different releases of the Unix and Linux operating systems, versions of the MacOS® for Macintosh computers, embedded operating systems, real-time operating systems, open source operating systems, proprietary operating systems, or other operating systems capable of running on the computing device and performing the operations described herein. In exemplary embodiments, the operating system 716 may be run in native mode or emulated mode. In an exemplary embodiment, the operating system 716 may be run on one or more cloud machine instances.

Figure 8:
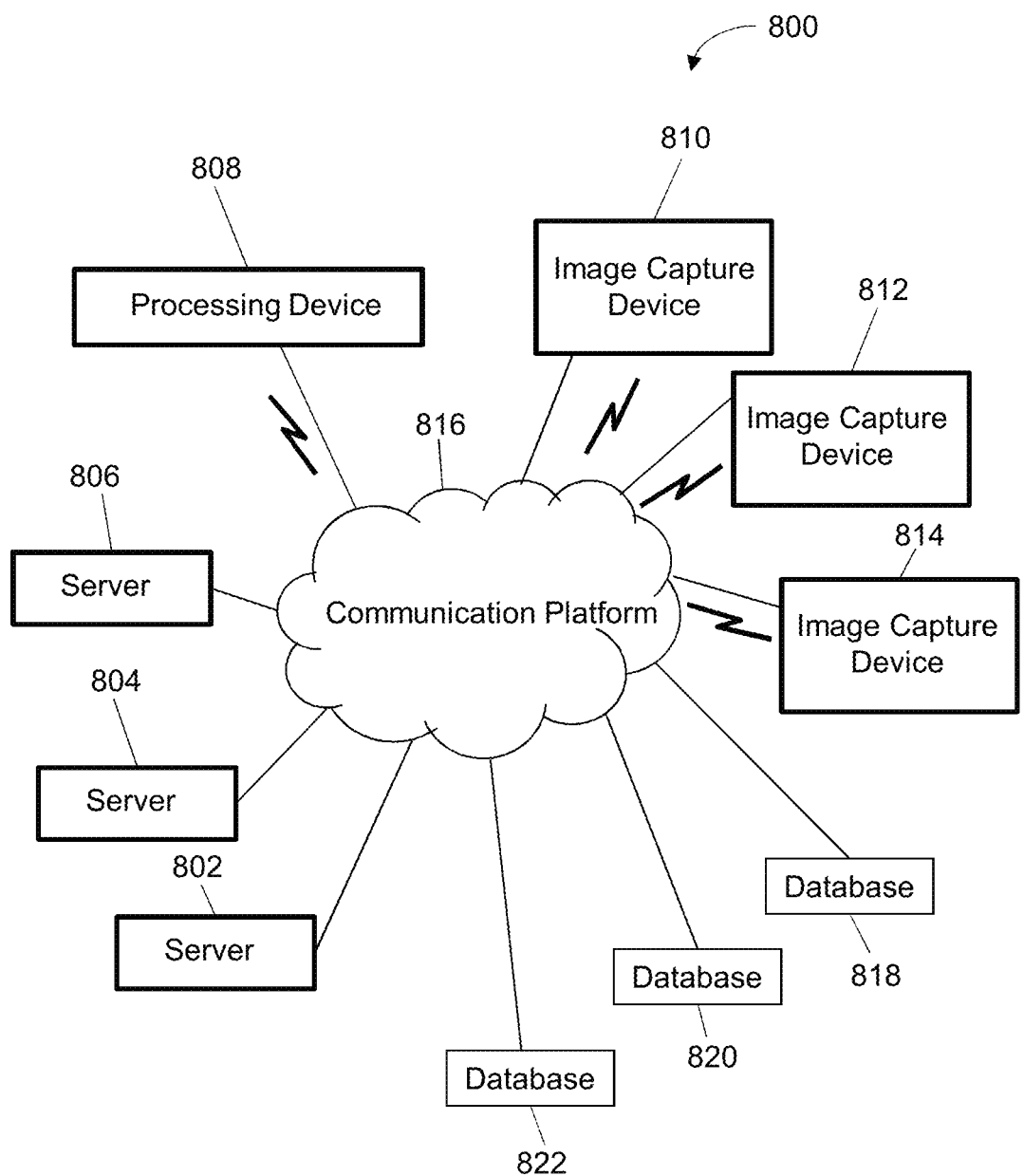
FIG. 8 is a block diagram of an item monitoring system environment in an embodiment.

FIG. 8 is a block diagram of an exemplary sensing or item monitoring system environment 800 in accordance with exemplary embodiments of the present disclosure. The environment 800 can include servers 802, 804, 806 operatively coupled to a processing device 808, and image capture devices 810, 812, 814, via a communication platform 816, which can be any network over which information can be transmitted between devices communicatively coupled to the network. For example, the communication platform 816 can be the Internet, Intranet, virtual private network (VPN), wide area network (WAN), local area network (LAN), and the like. In an embodiment, the communication platform 816 can be part of a cloud environment. The environment 800 can include repositories or databases 818, 820, 822, which can be operatively coupled to the servers 802, 804, 806, as well as to the processing device 808, and image capture devices 810, 812, 814, via the communications platform 816. In exemplary embodiments, the servers 802, 804, 806, processing device 808, image capture devices 810, 812, 814, and databases 818, 820, 822 can be implemented as computing devices (e.g., computing device 700). Those skilled in the art will recognize that the databases 818, 820, 822 can be incorporated into one or more of the servers 802, 804, 806 such that one or more of the servers 802, 804, 806 can include databases 818, 820, 822. In an embodiment, the database 818 can store the light information 122, and the database 820 can store the shelf information 124. In an embodiment, a single database 818, 820, 822 can store the light information 122 and the shelf information 124.

In an embodiment, embodiments of the servers 802, 804, 806 can be configured to implement one or more portions of the system 100. For example, server 802 can be configured to implement one or more portions of the image capture device 112. As a further example, server 804 can be configured to implement one or more portions of the communication interface 114.

Figure 9:
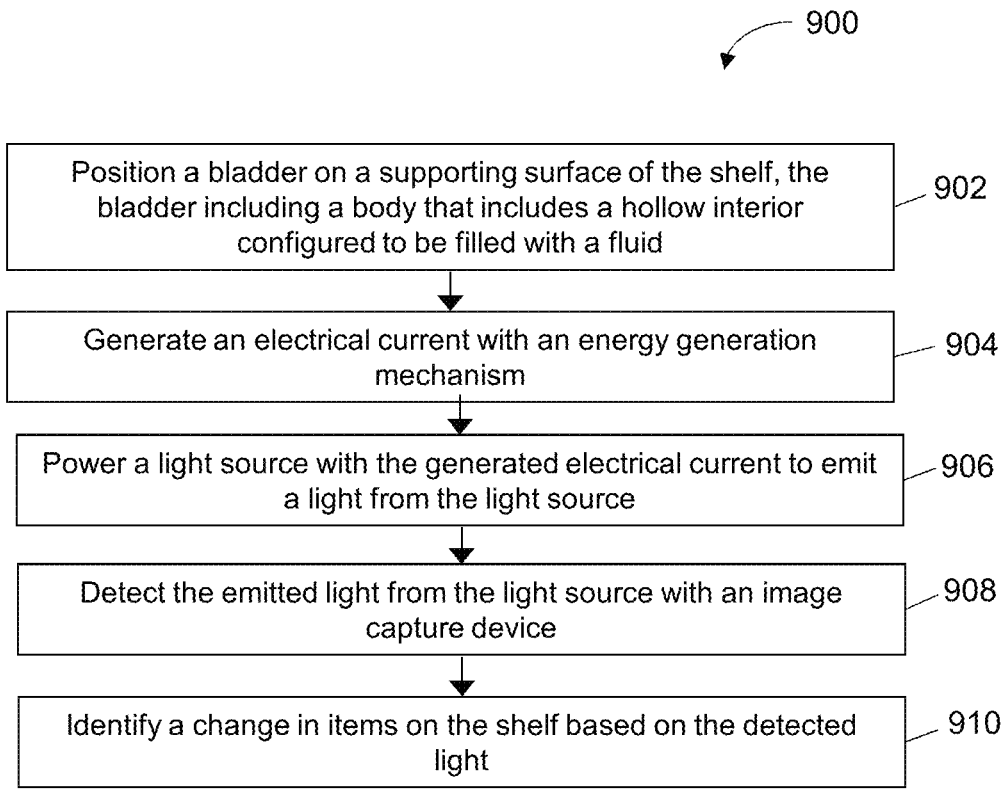
FIG. 9 is a flowchart illustrating an implementation of an item monitoring system in an embodiment.

FIG. 9 is a flowchart illustrating an exemplary process 900 as implemented by the item monitoring system 100. To begin, at step 902, a bladder is positioned on a supporting surface of a shelf. The bladder includes a body that includes a hollow interior configured to be filled with a fluid. At step 904, an electrical current is generated with an energy generation mechanism including a tube with an interior passage in fluid communication with the hollow interior of the body of the bladder, and a magnetic item movably disposed within the tube, based on displacement of the fluid from the bladder into the interior passage of the tube and movement of the magnetic item within the tube. At step 906, a light source is powered with the generated electrical current to emit a light from the light source. At step 908, the emitted light from the light source is detected with an image capture device. At step 910, a change in items on the shelf is identified based on the detected light.

Figure 10:
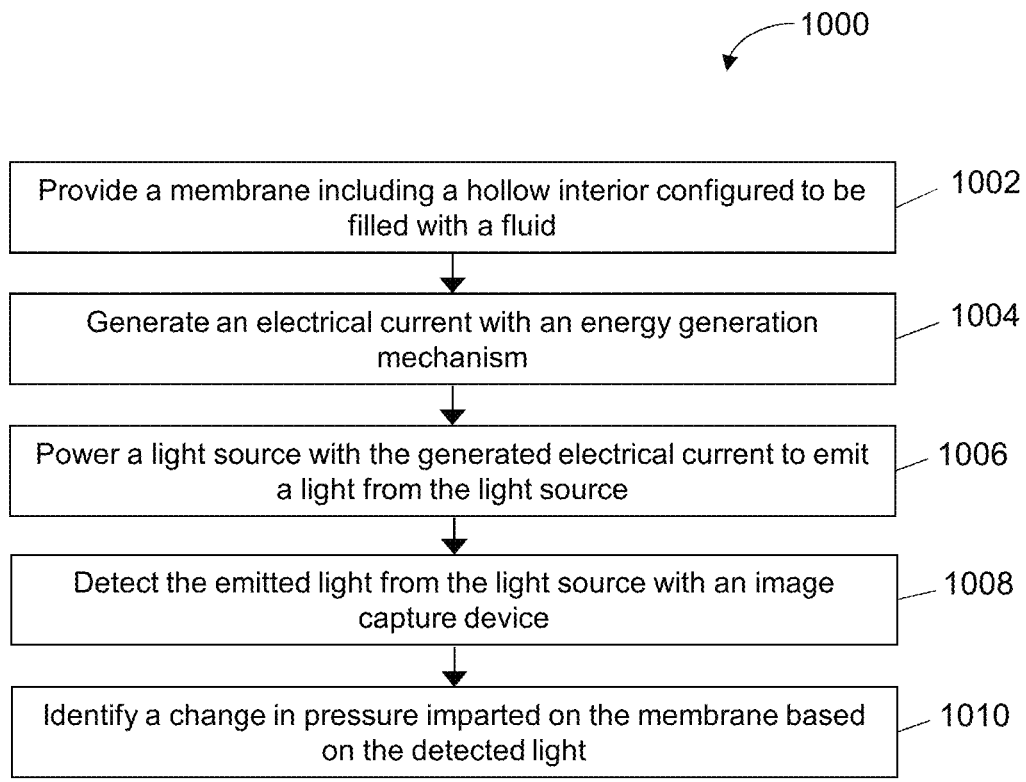
FIG. 10 is a flowchart illustrating an implementation of a sensing system in an embodiment.

It should be appreciated that certain components of the system 100 can be used outside of the shelf inventory monitoring environment. For example, the system 100 can be used as a mat across which people walk, with the change in pressure on the mat indicating the number of people passing across the mat and causing a corresponding display of light. FIG. 10 is a flowchart illustrating an exemplary process 1000 as implemented by a sensing system (e.g., a membrane, energy generation mechanism, and light source as disclosed in the system 100) outside a shelf inventory monitoring environment. To begin, at step 1002, a membrane is provided that includes a hollow interior configured to be filled with a fluid. At step 1004, an electrical current is generated with an energy generation mechanism including a tube with an interior passage in fluid communication with the hollow interior of the membrane, and a magnetic item movably disposed within the tube, based on displacement of the fluid from the membrane into the interior passage of the tube and movement of the magnetic item within the tube. For example, the membrane may be included in a floor mat and be depressed by individuals walking on the mat. At step 1006, a light source is powered with the generated electrical current to emit a light from the light source. At step 1008, the emitted light is detected from the light source with an image capture device. At step 1010, a change in pressure imparted on the membrane is identified based on the detected light.

While exemplary embodiments have been described herein, it is expressly noted that these embodiments should not be construed as limiting, but rather that additions and modifications to what is expressly described herein also are included within the scope of the invention. Moreover, it is to be understood that the features of the various embodiments described herein are not mutually exclusive and can exist in various combinations and permutations, even if such combinations or permutations are not made express herein, without departing from the spirit and scope of the invention.

The invention claimed is:

1. An item monitoring system, comprising:
a bladder configured to be positioned on a supporting surface of a shelf and further configured to receive one or more items thereon, the bladder including:
a body that includes a hollow interior configured to be filled with a fluid;
an energy generation mechanism connected to the bladder, the energy generation mechanism including (i) a tube equipped with a wire core or surrounded by a wire coil and including an interior passage in fluid communication with the hollow interior of the body of the bladder, and (ii) a magnetic item movably disposed within the tube; and
a light source electrically connected to the energy generation mechanism;
wherein displacement of at least a portion of the fluid from the hollow interior of the body into the interior passage of the tube due to the one or more items placed on the body of the bladder moves the magnetic item within the tube; and
wherein movement of the magnetic item within the tube generates an electrical current to emit a light from the light source.

2. The item monitoring system of claim 1, wherein the bladder defines an elongated and planar configuration.

3. The item monitoring system of claim 1, wherein the body of the bladder includes a bottom planar surface configured to be positioned on the supporting surface of the shelf, and a planar top surface configured to receive the one or more items thereon.

4. The item monitoring system of claim 1, wherein the bladder is fabricated from a flexible material.

5. The item monitoring system of claim 1, wherein a fluidic connection between the hollow interior of the body and the interior passage of the tube defines a closed system.

6. The item monitoring system of claim 1, wherein the fluid is at least one of air or liquid.

7. The item monitoring system of claim 1, wherein the tube comprises a cylindrical tube with a wire core.

8. The item monitoring system of claim 1, wherein the tube is vertically oriented relative to a horizontal orientation of the shelf.

9. The item monitoring system of claim 1, wherein the energy generation mechanism is a sole energy source for the light source.

10. The item monitoring system of claim 1, wherein the light source is a light emitting diode (LED).

11. The item monitoring system of claim 1, wherein the light emitted from the light source is not detectable by a human eye.

12. The item monitoring system of claim 1, wherein placing the one or more items on the body of the bladder creates a compression force on the body, the compression force causing the displacement of at least a portion of the fluid from the hollow interior of the body into the interior passage of the tube.

13. The item monitoring system of claim 12, wherein removal of the one or more items from the body of the bladder removes the compression force from the body, removal of the compression force causing displacement of at least a portion of the fluid from the interior passage of the tube to the hollow interior of the body.

14. The item monitoring system of claim 1, wherein the tube defines a tube height extending between a bottom item position and a top item position, and wherein a position of the magnetic item within the tube relative to the bottom item position and the top item position is affected by an amount of the fluid displaced from the hollow interior of the body into the interior passage of the tube.

15. The item monitoring system of claim 14, wherein based on the position of the magnetic item within the tube relative to the bottom item position and the top item position, a different color light is emitted from the light source.

16. The item monitoring system of claim 14, wherein the position of the magnetic item within the tube relative to the bottom item position and the top item position corresponds to a fullness of the shelf with the one or more items.

17. The item monitoring system of claim 1, wherein the magnetic item is a magnetic ball.

18. An item monitoring system, comprising:
a bladder configured to be positioned on a supporting surface of a shelf and further configured to receive one or more items thereon, the bladder including:
a body that includes a hollow interior configured to be filled with a fluid;
an energy generation mechanism connected to the body, the energy generation mechanism including (i) a tube equipped with a wire core or surrounded by a wire coil and including an interior passage in fluid communication with the hollow interior of the body of the bladder, and (ii) a magnetic item movably disposed within the tube; and a light source electrically connected to the energy generation mechanism; and an image capture device;

wherein displacement of at least a portion of the fluid from the hollow interior of the body into the interior passage of the tube due to the one or more items placed on the body of the bladder moves the magnetic item within the tube;

wherein movement of the magnetic item within the tube generates an electrical current to emit a light from the light source; and wherein the image capture device is configured to detect the light emitted from the light source to determine a fullness of the shelf with the one or more items.

19. The item monitoring system of claim 18, wherein the image capture device is a camera.

20. A method of monitoring items on a shelf including a supporting surface, the method comprising:

positioning a bladder on the supporting surface of the shelf, the bladder including a body that includes a hollow interior configured to be filled with a fluid;

detecting with an image capture device light from a light source electrically connected to an energy generation mechanism connected to the body of the bladder, the energy generation mechanism including (i) a tube equipped with a wire core or surrounded by a wire coil and including an interior passage in fluid communication with the hollow interior of the body of the bladder, and (ii) a magnetic item movably disposed within the tube; and identifying a change in items on the shelf based on the detected light;

wherein positioning one or more items on the bladder displaces at least a portion of the fluid from the hollow interior of the body into the interior passage of the tube causing movement of the magnetic item; and wherein movement of the magnetic item within the tube generates an electrical current to emit a light from the light source.

\* \* \* \* \*